No. 811,630. PATENTED FEB. 6, 1906.
C. GLOVER.
BEARING.
APPLICATION FILED OCT. 10, 1905.
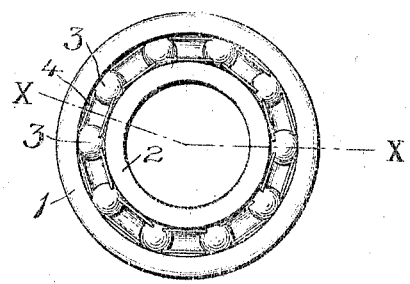
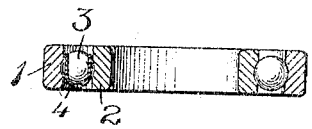
 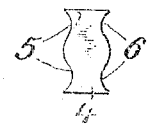
Witnesses
Chas. A. Pearl
Inventor
CHARLES GLOVER
By his Attorneys

UNITED STATES PATENT OFFICE.

CHARLES GLOVER, OF NEW BRITAIN, CONNECTICUT, ASSIGNOR TO CORBIN SCREW CORPORATION, OF NEW BRITAIN, CONNECTICUT, A CORPORATION OF CONNECTICUT.

BEARING.

No. 811,630.  Specification of Letters Patent.  Patented Feb. 6, 1906.

Application filed October 10, 1905. Serial No. 282,145.

*To all whom it may concern:*

Be it known that I, CHARLES GLOVER, a citizen of the United States, residing at New Britain, county of Hartford, Connecticut, have invented certain new and useful Improvements in Bearings, of which the following is a full, clear, and exact description.

My invention relates to what are termed "antifriction-bearings."

The object of the invention is to provide a bearing having antifriction-balls with spacers which can be manufactured cheaply, readily installed or removed, and which will produce a minimum amount of friction and serve to retain a suitable lubricant.

My invention consists in providing two annular bearing-rings, the smaller one revolving within the other on a series of balls which are separated by trough-like pieces of metal of a special design.

Figure 1 is an end view of a bearing embodying my invention. Fig. 2 is a section on the plane of the line X X, Fig. 1. Fig. 3 is a side view of a trough-shaped piece of metal for separating the balls. Fig. 4 shows the stamped piece of metal for forming the separator shown in Fig. 3.

1 is the outer bearing-ring, which may be secured in the hub of a wheel. 2 is the inner bearing-ring, in which a shaft may be held. Both rings are slightly grooved.

3 3 are the balls upon which the ring 2 revolves.

4 represents trough-shaped pieces of metal for separating the balls and also for holding grease for lubricating the balls. The separator 4 is stamped from a blank of sheet metal with its ends as shown at 5 and 6. It will be seen that by having the ends formed in this way they are adapted when formed into a semi tube or trough to be held in place between the balls.

In assembling, the balls are all put between the bearing-ring and shaft-ring, and then the separators are placed between the balls one at a time. Being formed of spring metal they will readily slip in place, but may be as easily removed.

What I claim is—

1. A bearing having an outer grooved ring, an inner grooved ring, balls therein, and trough-shaped pieces of sheet metal for separating the balls.

2. A bearing having an outer grooved ring, an inner grooved ring, balls therein, and trough-shaped pieces of sheet metal for separating the balls, having recesses 5 and 6.

3. A bearing comprising an outer grooved ring, an inner grooved ring, a series of balls located between said rings, and a series of sheet-metal separators or spacers located between said balls, the sides of the separators being yielding to permit insertion and removal.

CHARLES GLOVER.

Witnesses:
 WILLIAM V. COLLINS,
 LAURA M. BRAMAN.